United States Patent
Ye et al.

(10) Patent No.: US 12,549,119 B2
(45) Date of Patent: Feb. 10, 2026

(54) DIRECT LOCATING METHOD FOR CALCULATING POSITION OF PERMANENT MAGNET SYNCHRONOUS MOTOR

(71) Applicants: ZHEJIANG UNIVERSITY, Zhejiang (CN); ZHEJIANG UNIVERSITY ADVANCED ELECTRICAL EQUIPMENT INNOVATION CENTER, Zhejiang (CN)

(72) Inventors: Mengting Ye, Zhejiang (CN); Yanfei Cao, Zhejiang (CN); Zhichen Lin, Zhejiang (CN); Zhiqiang Wang, Zhejiang (CN); Tingna Shi, Zhejiang (CN); Changliang Xia, Zhejiang (CN)

(73) Assignees: ZHEJIANG UNIVERSITY, Zhejiang (CN); ZHEJIANG UNIVERSITY ADVANCED ELECTRICAL EQUIPMENT INNOVATION CENTER, Zhejiang (CN)

( * ) Notice: Subject to any disclaimer, the term of this patent is extended or adjusted under 35 U.S.C. 154(b) by 212 days.

(21) Appl. No.: 18/624,043

(22) Filed: Apr. 1, 2024

(65) Prior Publication Data
US 2024/0364247 A1    Oct. 31, 2024

Related U.S. Application Data

(63) Continuation of application No. PCT/CN2023/130333, filed on Nov. 8, 2023.

(30) Foreign Application Priority Data

Apr. 28, 2023    (CN) .......................... 202310476312.9

(51) Int. Cl.
*H02P 21/00* (2016.01)
*H02P 21/18* (2016.01)
*H02P 21/22* (2016.01)

(52) U.S. Cl.
CPC .......... *H02P 21/18* (2016.02); *H02P 21/0017* (2013.01); *H02P 21/22* (2016.02); *H02P 2207/05* (2013.01)

(58) Field of Classification Search
CPC ...... H02P 21/18; H02P 21/22; H02P 21/0017; H02P 2207/05
(Continued)

(56) References Cited

U.S. PATENT DOCUMENTS

| 6,163,127 A | 12/2000 | Patel et al. |
| 11,239,772 B1 * | 2/2022 | Bojoi ...................... H02P 21/22 |

(Continued)

FOREIGN PATENT DOCUMENTS

| CN | 112886880 | 6/2021 |
| CN | 113676102 | 11/2021 |

(Continued)

OTHER PUBLICATIONS

"International Search Report (Form PCT/ISA/210) of PCT/CN2023/130333," mailed on Feb. 4, 2024, pp. 1-4.

(Continued)

*Primary Examiner* — Gabriel Agared
(74) *Attorney, Agent, or Firm* — JCIPRNET

(57) ABSTRACT

A direct locating method for calculating a position of a permanent magnet synchronous motor is provided. The direct locating method performed by a processor includes: three-phase stator currents of the permanent magnet synchronous motor are converted by coordinate to obtain the stator currents in the αβ two-phase stationary coordinate system, and the initial position region is determined. The stator currents in dq two-phase synchronous rotating coordinate system are obtained by coordinate conversion. The stator current cost model is established. Then the d-axis stator current is inputted into the cost model and the position (Continued)

is outputted, and the final estimated position is determined to realize the direct locating of the permanent magnet synchronous motor's position.

4 Claims, 3 Drawing Sheets

(58) Field of Classification Search
USPC .................................................. 318/400.02
See application file for complete search history.

(56) References Cited

U.S. PATENT DOCUMENTS

| | | | | |
|---|---|---|---|---|
| 2009/0096396 A1* | 4/2009 | Sieber | ................ | H02P 6/005 |
| | | | | 318/400.33 |
| 2014/0145654 A1* | 5/2014 | Zhang | ................ | H02P 6/183 |
| | | | | 318/400.02 |
| 2014/0225548 A1* | 8/2014 | Xu | .................... | H02P 21/13 |
| | | | | 318/400.33 |
| 2015/0171784 A1* | 6/2015 | Lipo | .................. | H02P 21/22 |
| | | | | 318/729 |
| 2019/0181788 A1* | 6/2019 | Koteich | ............. | H02P 21/18 |
| 2023/0062832 A1* | 3/2023 | Li | ...................... | H02P 21/22 |

FOREIGN PATENT DOCUMENTS

| | | |
|---|---|---|
| CN | 114244223 | 3/2022 |
| CN | 116545325 | 8/2023 |

OTHER PUBLICATIONS

"Written Opinion of the International Searching Authority (Form PCT/ISA/237) of PCT/CN2023/130333," mailed on Feb. 4, 2024, pp. 1-4.

Jiang, Jun et al., "Speed and Rotor Position Estimation for PMSM Based on EKF", Journal of System Simulation, vol. 17, No. 7, Jul. 20, 2005, with English abstract thereof, pp. 1704-1707.

* cited by examiner

DIRECT LOCATING METHOD FOR CALCULATING POSITION OF PERMANENT MAGNET SYNCHRONOUS MOTOR

CROSS-REFERENCE TO RELATED APPLICATION

This application is a continuation of international application of PCT application serial no. PCT/CN2023/130333 filed on Nov. 8, 2023, which claims the priority benefit of China application no. 202310476312.9 filed on Apr. 28, 2023. The entirety of each of the above mentioned patent applications is hereby incorporated by reference herein and made a part of this specification.

BACKGROUND

Technical Field

The invention relates to a direct locating method of a rotor position, in particular to a direct locating method for calculating a position of a permanent magnet synchronous motor.

Description of Related Art

With the development of power electronic technology, automatic control theory and computer technology, the performance of AC speed control system is constantly improved, breaking the dominance of DC speed control in the field of high-performance speed control. In the AC speed regulation system, with the development and application of permanent magnet materials, permanent magnet synchronous motors with high power density, simple structure and large power factor have received more and more attention, especially in new energy vehicles, aerospace, flywheel energy storage, national defense industry and other occasions where the motor volume, weight and reliability requirements are harsh. When the permanent magnet synchronous motor is running, the system controller needs to obtain the position of the motor in real time. The commonly used scheme to detect position is to install mechanical position sensors, such as photoelectric encoders, rotary transformers, etc. However, the mechanical position sensor increases the system cost and limits the application of the product. At the same time, the mechanical position sensor increases the volume of the motor and the moment of inertia of the rotating shaft and reduces the power density of the motor. In addition, the mechanical position sensor is susceptible to the interference of temperature and electromagnetic noise, which reduces the operation reliability of the device. In addition, in some special applications, such as shaftless thrusters in submarines, traditional mechanical position sensors cannot be used.

Sensorless control technology of the permanent magnet synchronous motor can extract position by real-time analysis of motor port voltage and current, without the need to install position sensor, which can ensure the reliability of the system and reduce the volume and cost of the system, so it has received wide attention. Generally, sensorless control of permanent magnet synchronous motors can be divided into two categories: based on the motor fundamental wave model and based on the salient pole tracking. Among them, the sensorless control method based on the motor fundamental wave model is often used in the medium and high speed operation range, that is, the position is solved according to the mathematical model of the permanent magnet synchronous motor itself or various reconstructed observers according to its mathematical model, mainly including model reference adaptive observer method, sliding mode observer method, extended Kalman filter method, etc. Among them, the sliding mode observer method has become the research hotspot of the permanent magnet synchronous motor sensorless control because of its good dynamic performance and strong robustness. However, the back electromotive force or flux observed by the sliding mode observer contains high order harmonics, and the estimated position is generally demodulated by a phase-locked loop (PLL) with the characteristic of simple and easy to implement.

Traditional PLL contains a proportional integral regulator with fixed gain, which reduces the bandwidth of the control system and affects the dynamic performance. At the same time, the fixed gain is determined by experience, and the portability is poor. To solve this problem, some scholars combined Kalman filter and phase-locked loop and proposed a phase-locked loop based on static linear Kalman filter. However, the superior dynamic performance of the method relies on two parameters that are adjusted empirically. Therefore, based on the basic idea of finite control set model predictive control, some scholars proposed a finite position set-phase-locked loop, in which the rotor position plane is discretized into a finite number of rotor positions, and the position is estimated with rolling optimization by constructing a cost function based on the back electromotive force. This method does not need to be combined with an observer and does not depend on motor parameters. It has the advantages of fast dynamic response and strong robustness. However, to obtain a more accurate position, at least 24 iterations of the optimization process are required. For the permanent magnet synchronous motor, to improve the control performance, it is necessary to obtain more accurate rotor position information and increase the control frequency of the system to ensure a large enough carrier ratio. Therefore, reducing the calculation amount of sensorless control algorithm and estimating more accurate rotor position in a shorter control period are of great significance for improving the control performance of permanent magnet synchronous motors.

SUMMARY

To solve the problems existing in the background technology, the invention provides a direct locating method for calculating a position of a permanent magnet synchronous motor to reduce the calculation amount of the sensorless control algorithm.

The technical scheme adopted by the invention is:

The direct locating method for calculating the position of the permanent magnet synchronous motor comprises the following steps performed by a processor:

Step 1: the three-phase stator currents of the PMSM sampled at each period are converted to obtain the stator currents in the $\alpha\beta$ two-phase stationary coordinate system, and the initial position region of the PMSM is determined according to the stator currents in the $\alpha\beta$ two-phase stationary coordinate system.

Step 2: the stator currents of the PMSM in the $\alpha\beta$ two-phase stationary coordinate system are converted to obtain the stator current of the PMSM in the dq two-phase synchronous rotation coordinate system.

Step 3: establish the stator current cost model of the permanent magnet synchronous motor. Input the d-axis stator current of the permanent magnet synchronous motor in the dq two-phase synchronous rotation coordinate system into the stator current cost model and then the position of the permanent magnet synchronous motor is outputted. At the same time, according to the stator currents of PMSM in αβ two-phase stationary coordinate system and dq two-phase synchronous rotation coordinate system, the final estimated position is determined from the initial position region of PMSM, and the direct locating of the PMSM position by a processor is realized.

In step 1, the three-phase stator currents of the PMSM sampled at each period are converted by coordinate to obtain the stator currents of the PMSM in αβ two-phase stationary coordinate system. Specifically, the A-phase stator current $i_a$, B-phase stator current $i_b$, and C-phase stator current $i_c$ of the permanent magnet synchronous motor are converted to obtain the α-axis stator current $i_\alpha$ and β-axis stator current $i_\beta$ in the α-β two-phase stationary coordinate system, respectively.

In step 1, the initial position region of the PMSM's position is determined according to the stator currents of the PMSM in the αβ two-phase stationary coordinate system. Specifically, when $i_\alpha(k)>0$ and $i_\beta(k)>0$, the initial position region is R1, [0, 0.5π]. When $i_\alpha(k)<0$ and $i_\beta(k)>0$, the initial position region is R2, [0.5π, π]. When $i_\alpha(k)<0$ and $i_\beta(k)<0$, the initial position region is R3, [π, 1.5π]. When $i_\alpha(k)>0$ and $i_\beta(k)<0$, the initial position region is R4, [1.5π, 2π]. $i_\alpha(k)$ and $i_\beta(k)$ are the α-axis stator current and β-axis stator current of a permanent magnet synchronous motor in the αβ two-phase stationary coordinate system at the kth sampling period, respectively.

In the step 2, the stator currents of the permanent magnet synchronous motor in the αβ two-phase stationary coordinate system are converted to obtain the stator currents of the permanent magnet synchronous motor in the dq two-phase synchronous rotating coordinate system. Specifically, the α-axis stator current $i_\alpha$ and β-axis stator current $i_\beta$ in the αβ two-phase stationary coordinate system of the permanent magnet synchronous motor are converted by coordinate transformation to obtain the d-axis stator current $i_d$ and q-axis stator current $i_q$ in the dq two-phase synchronous rotation coordinate system.

In step 3, the stator current cost model of the permanent magnet synchronous motor is established as follows:

$$\min g_{op}(k) = |i_{dref}(k) - i_d(k)|$$

$$i_d(k) = A\sin(\theta + \varphi_k)$$

$$i_q(k) = A\sin(\theta + \varphi_k + \pi/2)$$

Where $g_{op}(k)$ is the d-axis stator current error of the permanent magnet synchronous motor at the kth sampling period in the dq two-phase synchronous rotation coordinate system. $i_{dref}(k)$ is the d-axis stator current reference of the permanent magnet synchronous motor at the kth sampling period in the dq two-phase synchronous rotation coordinate system. $i_d(k)$ and $i_q(k)$ are the d-axis stator current and q-axis stator current of a permanent magnet synchronous motor in dq two-phase synchronous rotation coordinate system at the kth sampling period, respectively. θ is the position of the permanent magnet synchronous motor. A is the stator current amplitude of the permanent magnet synchronous motor; $\varphi_k$ is the Angle between the stator current of the permanent magnet synchronous motor and the two-phase stationary coordinate system at the kth sampling period. $i_d(k)=A\sin(\theta+\varphi_k)$, $i_q(k)=A\sin(\theta+\varphi_k+\pi/2)$ are the mathematical model established by mathematical transformation with $i_d(k)=i_\alpha(k)\cos\theta+i_\beta(k)\sin\theta$ and $i_q(k)=-i_\alpha(k)\sin\theta+i_\beta(k)\cos\theta$, respectively.

The d-axis stator current error of a permanent magnet synchronous motor in the dq two-phase synchronous rotation coordinate system at the kth sampling period, $g_{op}(k)$, is equal to 0 at the minimum.

The Angle between the stator current of the permanent magnet synchronous motor and the two-phase stationary coordinate system at the kth sampling period, $\varphi_k$, is as follows:

$$\varphi_k = \arctan(i_\alpha(k)/i_\beta(k))$$

Where $i_\alpha(k)$ and $i_\beta(k)$ are the α-axis stator current and β-axis stator current of the permanent magnet synchronous motor in the αβ two-phase stationary coordinate system at the kth sampling period, respectively.

In step 3, according to the stator currents of the permanent magnet synchronous motor in the αβ two-phase stationary coordinate system and dq two-phase synchronous rotating coordinate system, the final estimated position is determined in the initial position region of the permanent magnet synchronous motor, as follows:

| Region | $i_\alpha$ | $i_\beta$ | $i_q$ | $\theta_{o1}$ |
|---|---|---|---|---|
| R1 | + | + | + | $2\pi-\varphi_k$ |
|  |  |  | − | $\pi-\varphi_k$ |
| R2 | − | + | + | $2\pi-\varphi_k$ |
|  |  |  | − | $3\pi-\varphi_k$ |
| R3 | − | − | + | $2\pi-\varphi_k$ |
|  |  |  | − | $3\pi-\varphi_k$ |
| R4 | + | − | + | $2\pi-\varphi_k$ |
|  |  |  | − | $\pi-\varphi_k$ |

Where $\theta_{o1}$ is the final estimated position of the permanent magnet synchronous motor in the initial rotor position region.

The beneficial effects of the invention are:
(1) The position plane is pre-divided into four regions by the stator current characteristics of the permanent magnet synchronous motor in the static coordinate system, and the estimated position is directly calculated according to the polarity of the q-axis stator current component in the two-phase synchronous rotating coordinate system, without iterative to optimize the estimated position. As a result, the computation of sensorless control algorithm is effectively reduced.
(2) The invention constructs a stator current cost function based on $i_d$. Compared with the traditional method constructing the cost function based on back electromotive force, and the invention further reduces the calculation amount.
(3) The invention directly calculates the estimated position according to the polarity of the stator current without additional observers for the back electromotive force or flux linkage, which improves the system bandwidth and is conducive to improve the dynamic performance of the permanent magnet synchronous motor sensorless control.

The method selects a pre-divided position region by the characteristics of the sampled stator current and constructs a cost function based on the stator current in the selected rotor position region. The estimated position is directly calculated according to the polarity of the q-axis stator current component in the two-phase synchronous rotation coordinate system. The biggest advantage is that no additional rotor polarity judgment method is required. It also does not need iterative optimization for the estimated position by, which reduces the algorithm calculation amount of the permanent magnet synchronous motor sensorless control.

DESCRIPTION OF THE EMBODIMENTS

The invention is further explained in detail in combination with the attached drawings and specific embodiments.

Figure 1:
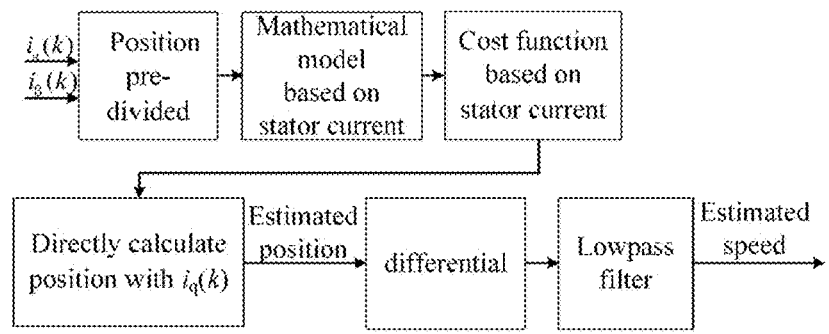
FIG. 1 is a structure block diagram of the invention method.

As shown in FIG. 1, the direct locating method of the permanent magnet synchronous motor's position comprises the following steps performed by a processor:

Step 1: the three-phase stator currents of the PMSM sampled at each period are converted to obtain the stator currents in the αβ two-phase stationary coordinate system, and the initial position region of the PMSM is determined according to the stator currents in the αβ two-phase stationary coordinate system.

In step 1, the three-phase stator currents of the PMSM sampled at each period are converted by coordinate to obtain the stator currents of the PMSM in αβ two-phase stationary coordinate system. Specifically, the A-phase stator current $i_a$, B-phase stator current $i_b$ and C-phase stator current $i_c$ of the permanent magnet synchronous motor are converted to obtain the α-axis stator current $i_\alpha$ and β-axis stator current $i_\beta$ in the α-β two-phase stationary coordinate system, respectively.

In step 1, the initial position region of the PMSM's position is determined according to the stator currents of the PMSM in the αβ two-phase stationary coordinate system. Specifically, when $i_\alpha(k)>0$ and $i_\beta(k)>0$, the initial position region is R1, [0, 0.5π]. When $i_\alpha(k)<0$ and $i_\beta(k)>0$, the initial position region is R2, [0.5π, π]. When $i_\alpha(k)<0$ and $i_\beta(k)<0$, the initial position region is R3, [π, 1.5π]. When $i_\alpha(k)>0$ and $i_\beta(k)<0$, the initial position region is R4, [1.5π, 2π]. $i_\alpha(k)$ and $i_\beta(k)$ are the α-axis stator current and β-axis stator current of a permanent magnet synchronous motor in the αβ two-phase stationary coordinate system at the kth sampling period, respectively.

Step 2: The stator currents of the PMSM in the αβ two-phase stationary coordinate system are converted to obtain the stator current of the PMSM in the dq two-phase synchronous rotation coordinate system.

In the step 2, the stator currents of the permanent magnet synchronous motor in the αβ two-phase stationary coordinate system are converted to obtain the stator currents of the permanent magnet synchronous motor in the dq two-phase synchronous rotating coordinate system. Specifically, the α-axis stator current $i_\alpha$ and β-axis stator current is in the αβ two-phase stationary coordinate system of the permanent magnet synchronous motor are converted by coordinate transformation to obtain the d-axis stator current $i_\alpha$ and q-axis stator current $i_q$ in the dq two-phase synchronous rotation coordinate system.

Step 3: Establish the stator current cost model of the permanent magnet synchronous motor. Input the d-axis stator current of the permanent magnet synchronous motor in the dq two-phase synchronous rotation coordinate system into the stator current cost model and then the position of the permanent magnet synchronous motor is outputted. At the same time, according to the stator currents of PMSM in αβ two-phase stationary coordinate system and dq two-phase synchronous rotation coordinate system, the final estimated position is determined from the initial position region of PMSM, and the direct locating of the PMSM position is realized.

In step 3, the stator current cost model of the permanent magnet synchronous motor is established as follows:

$$\min g_{op}(k) = |i_{dref}(k) - i_d(k)|$$

$$i_d(k) = A\sin(\theta + \varphi_k)$$

$$i_q(k) = A\sin(\theta + \varphi_k + \pi/2)$$

Where $g_{op}(k)$ is the d-axis stator current error of the permanent magnet synchronous motor at the kth sampling period in the dq two-phase synchronous rotation coordinate system. $i_{dref}(k)$ is the d-axis stator current reference of the permanent magnet synchronous motor at the kth sampling period in the dq two-phase synchronous rotation coordinate system. $i_d(k)$ and $i_q(k)$ are the d-axis stator current and q-axis stator current of a permanent magnet synchronous motor in dq two-phase synchronous rotation coordinate system at the kth sampling period, respectively. θ is the position of the permanent magnet synchronous motor. A is the stator current amplitude of the permanent magnet synchronous motor; $\varphi_k$ is the Angle between the stator current of the permanent magnet synchronous motor and the two-phase stationary coordinate system at the kth sampling period. $i_d(k)$=Asin(θ+$\varphi_k$), $i_q(k)$=Asin(θ+$\varphi_k$+π/2) are the mathematical model established by mathematical transformation with $i_d(k)$=$i_\alpha(k)$ cos θ+$i_\beta(k)$sin θ and $i_q(k)$=−$i_\alpha(k)$sin θ+$i_\beta(k)$cos θ, respectively.

The d-axis stator current error of a permanent magnet synchronous motor in the dq two-phase synchronous rotation coordinate system at the kth sampling period, $g_{op}(k)$, is equal to 0 at the minimum.

The Angle between the stator current of the permanent magnet synchronous motor and the two-phase stationary coordinate system at the kth sampling period, $\varphi_k$, is as follows:

$$\varphi_k = \arctan(i_\alpha(k)/i_\beta(k))$$

Where $i_\alpha(k)$ and $i_\beta(k)$ are the α-axis stator current and β-axis stator current of the permanent magnet synchronous motor in the αβ two-phase stationary coordinate system at the kth sampling period, respectively.

In step 3, according to the stator currents of the permanent magnet synchronous motor in the αβ two-phase stationary coordinate system and dq two-phase synchronous rotating coordinate system, the final estimated position is determined in the initial position region of the permanent magnet synchronous motor, as follows:

| Region | $i_\alpha$ | $i_\beta$ | $i_q$ | $\theta_{o1}$ |
|---|---|---|---|---|
| R1 | + | + | + | $2\pi-\varphi_k$ |
|    |   |   | − | $\pi-\varphi_k$ |
| R2 | − | + | + | $2\pi-\varphi_k$ |
|    |   |   | − | $3\pi-\varphi_k$ |
| R3 | − | − | + | $2\pi-\varphi_k$ |
|    |   |   | − | $3\pi-\varphi_k$ |
| R4 | + | − | + | $2\pi-\varphi_k$ |
|    |   |   | − | $\pi-\varphi_k$ |

Where $\theta_{o1}$ is the final estimated position of the permanent magnet synchronous motor in the initial rotor position region.

The direct locating method of the invention for the permanent magnet synchronous motor position is as follows:

Step 1: Determine the region where the rotor is located:

At the kth cycle, the three-phase stator currents $i_a(k)$, $i_b(k)$ and $i_c(k)$ are obtained by the current sensor sampling, and the stator currents $i_\alpha(k)$ and $i_\beta(k)$ in the αβ two-phase stationary coordinate system are obtained by coordinate transformation. The expression is as follows:

$$\begin{bmatrix} i_\alpha(k) \\ i_\beta(k) \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a(k) \\ i_b(k) \\ i_c(k) \end{bmatrix}$$

Figure 2:
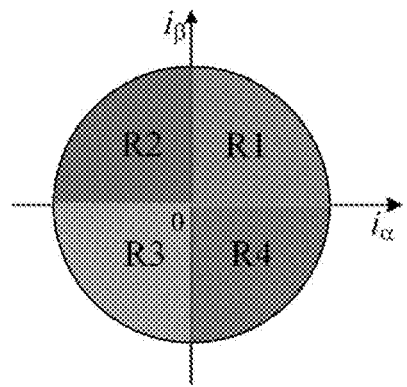
FIG. 2 is the schematic diagram of the position pre-subdivision.

According to the polarity of the stator currents $i_\alpha(k)$ and $i_\beta(k)$, the entire position plane can be divided into four regions, as shown in FIG. 2. When $i_\alpha(k)>0$ and $i_\beta(k)>0$, the rotor position is in the R1 region. When $i_\alpha(k)<0$ and $i_\beta(k)>0$, the rotor position is in the R2 region. When $i_\alpha(k)<0$ and $i_\beta(k)<0$, the rotor position is in R3 region. When $i_\alpha(k)>0$ and $i_\beta(k)<0$, the rotor position is in the R4 region. $i_\alpha(k)$ and $i_\beta(k)$ are the α-axis stator current and β-axis stator current of a permanent magnet synchronous motor in the αβ two-phase stationary coordinate system at the kth sampling period, respectively. On this basis, based on the mathematical model of the stator current, the stator current cost function of the permanent magnet synchronous motor is constructed, and the final estimated position is determined in the initial position region of the rotor position for the permanent magnet synchronous motor according to the stator current of the permanent magnet synchronous motor in the αβ two-phase stationary coordinate system and dq two-phase synchronous rotation coordinate system. The position of the permanent magnet synchronous motor can be calculated directly. The obtained estimated position is then passed through differential and low-pass filters to obtain the estimated speed.

Step 2, the stator currents of the permanent magnet synchronous motor in the αβ two-phase stationary coordinate system are converted to obtain the stator currents of the permanent magnet synchronous motor in the dq two-phase synchronous rotating coordinate system.

The mathematical models, with which of the stator current components $i_d$ and $i_q$ in dq two-phase synchronous rotating coordinate system are obtained from the stator current components $i_\alpha$ and $i_\beta$ in αβ two-phase stationary coordinate system through coordinate transform, are $i_d(k)=i_\alpha(k)\cos\theta+i_\beta(k)\sin\theta$ and $i_q(k)=-i_\alpha(k)\sin\theta+i_\beta(k)\cos\theta$. $i_\alpha(k)$ and $i_\beta(k)$ are the stator current components in the αβ two-phase stationary coordinate system at the kth sampling period. $i_d(k)$ and $i_q(k)$ are the stator current components in the two-phase rotating coordinate system at the kth sampling period. $\theta$ is the rotor position. After mathematical transformation, the mathematical model of $i_d$ and $i_q$ can be written as $i_d(k)=A\sin(\theta+\varphi_k)$, $i_q(k)=A\sin(\theta+\varphi_k+\pi/2)$. A is the stator current amplitude of the permanent magnet synchronous motor. $\varphi_k$ is the Angle between the stator current of the permanent magnet synchronous motor at the kth sampling period and the two-phase stationary coordinate system, $\varphi_k=\arctan(i_\alpha(k)/i_\beta(k))$.

Step 3: Build a cost function of the stator current component $i_d$ in the two-phase synchronous rotating coordinate system, and directly calculate the estimated position according to the polarity of the q-axis stator current component in the two-phase synchronous rotating coordinate system.

Figure 3:
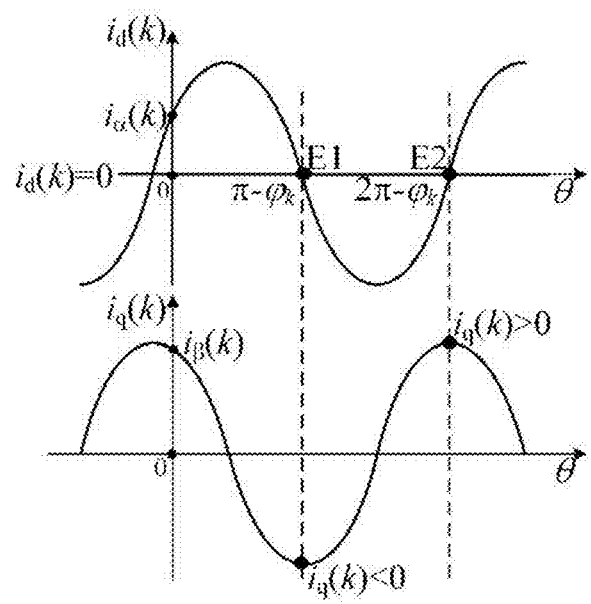
FIG. 3 shows the change of current with rotor position in R1.

According to the mathematical model of the stator current component $i_d$ in the dq two-phase synchronous rotating coordinate system, the stator current cost function based on $i_d$ is constructed as $g_{op}(k)=|i_{dref}(k)-i_d(k)|$, where $i_{dref}(k)$ is the d-axis stator current reference in the two-phase rotating coordinate system at the kth sampling period. According to the stator current cost function, the minimum value of the current cost function $g_{op}(k)$ can be obtained. However, there are two positions when $g_{op}(k)=0$, as shown in FIG. 3. At this time, $i_\alpha(k)>0$ and $i_\beta(k)>0$. When the stator current component of q axis in the two-phase rotating coordinate system, $i_q$, meets $i_q<0$, the position is E1. When $i_q>0$, the position is E2. On this basis, the estimated position is directly calculated according to the polarity of the stator current component $i_q(k)$ in the two-phase rotating coordinate system at the kth cycle. Take R1 as an example. $i_\alpha(k)>0$, $i_\beta(k)>0$, $0\leq\varphi_k\leq0.5\pi$. The waveform of stator current component changing with position in dq two-phase rotating coordinate system is shown in FIG. 3. As can be seen from FIG. 3, in R1, the position θ where current cost function $g_{op}(k)$ meets the minimum value, that is $g_{op}(k)=0$, has two locations: $\pi-\varphi_k$ and $2\pi-\varphi_k$. If $i_q(k)<0$, $\theta=\pi-\varphi_k$. When $i_q(k)>0$, $\theta=2\pi-\varphi_k$, that is, the estimated position can be directly calculated according to the polarity of $i_q(k)$. The analysis in other position regions is similar to the above, and the obtained results are shown in Table 1.

TABLE 1

Position region determination

| Region | $i_\alpha$ | $i_\beta$ | $i_q$ | $\theta_{o1}$ |
|---|---|---|---|---|
| R1 | + | + | + | $2\pi-\varphi_k$ |
|    |   |   | − | $\pi-\varphi_k$ |
| R2 | − | + | + | $2\pi-\varphi_k$ |
|    |   |   | − | $3\pi-\varphi_k$ |
| R3 | − | − | + | $2\pi-\varphi_k$ |
|    |   |   | − | $3\pi-\varphi_k$ |
| R4 | + | − | + | $2\pi-\varphi_k$ |
|    |   |   | − | $\pi-\varphi_k$ |

The invention method directly calculates the estimated position by the sampled stator current polarity and does not require additional position polarity judgment or embedded iteration rolling optimization for the estimated position. It can effectively reduce the algorithm calculation amount of the permanent magnet synchronous motor sensorless control.

To prove the effectiveness of the method, a test platform for a permanent magnet synchronous motor sensorless control system is built. The position optimization performance of the method is tested on the platform. Parameters of the tested permanent magnet synchronous motor are shown in Table 2.

TABLE 2

Motor parameter

| Parameter | Value | Unit |
|---|---|---|
| Rated voltage | 380 | V |
| Rated current | 4.2 | A |
| Rated torque | 0.4 | N · m |
| Pole pairs | 1 | pair |
| Stator resistance | 1.2 | Ω |
| Permanent magnet flux linkage | 0.00006 | wb |
| d/q axis inductance | 2.15 | mH |

Figure 4:
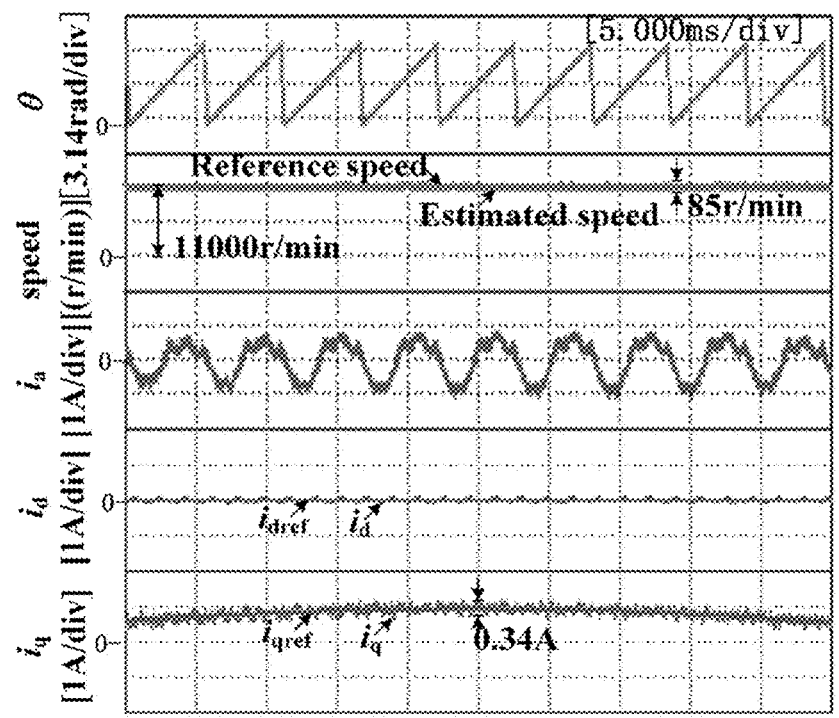
FIG. 4 is the steady-state performance experiment waveform of the method.
Figure 5:
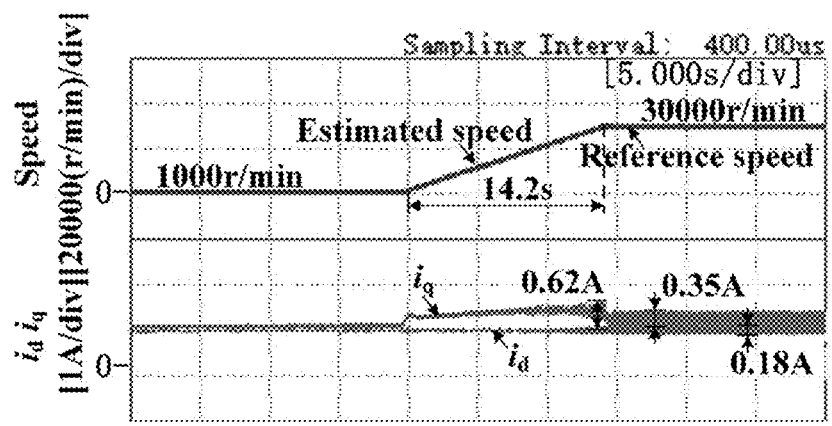
FIG. 5 is the experiment waveform of invention method when the speed ramp increases.

As shown in FIG. 4, it is the experimental waveform of the tested motor runs stably at 11000 r/min with the invention method. From top to bottom are the estimated position, reference speed and estimated speed, a phase current $i_a$, d-axis reference current $i_{dref}$ and actual current $i_d$, and q-axis reference current $i_{qref}$ and actual current $i_q$. [3.14 rad/div], [5000 (r/min)/div], [1 A/div] and [5.000 ms/div] respectively represent 3.14 rad for each box in the longitudinal position axis, 5000 r/min for each box in the speed axis, 1 A for each box in the current axis and 5 ms for each box in the transverse time axis. The permanent magnet synchronous motor uses the invention method increase the speed from 1000 r/min to 30000 r/min, and its experimental waveform is shown in FIG. 5. [2000 (r/min)/div], [1 A/div], and [5.000 s/div] respectively indicate that each cell of the longitudinal speed axis represents 2000 r/min, each cell of the current axis represents 1 A, and each cell of the horizontal time axis represents 5 s. It can be seen from FIG. 4 and FIG. 5 that when the permanent magnet motor runs stably at 11000 r/min with the invention method, the maximum fluctuation range of its estimated speed is within 85 r/min, and the maximum fluctuation range of q-axis current is within 0.34 A. It takes 14.2 s for the motor to increase the speed from 1000 r/min to 30000 r/min, during which the q-axis current $i_q$ reaches a maximum of 0.62 A. After the motor enters a steady state, q-axis current $i_q$ fluctuates within 0.35 A and d-axis current $i_d$ fluctuates within 0.18 A, that is, permanent magnet synchronous motor sensorless control can be realized with the invention method.

To prove the advantages of the invention, the calculation amount of the invention method is compared with other finite position set-PLL schemes, and the results are shown in Table 3.

TABLE 3

Computation comparison

| Algorithm | other finite position set-PLL schemes | the invention |
|---|---|---|
| Optimization model | Based on the back electromotive force, more complicated | $i_d$-based, relatively simple |
| Rotor polarity judgment | need | no |
| Iterations time P | 9 | 1 |
| Position number | 24 | 1 |
| Park times | 3 | 0 |
| error/rad | 0.00204 | 0 |

It can be seen from Table 3 that compared with other finite position set-PLL schemes, the invention method does not require additional position polarity judgment, nor does it require embedded iterative rolling optimization for the estimated position. As a result, the calculation amount of the invention is smaller.

Figure 6:
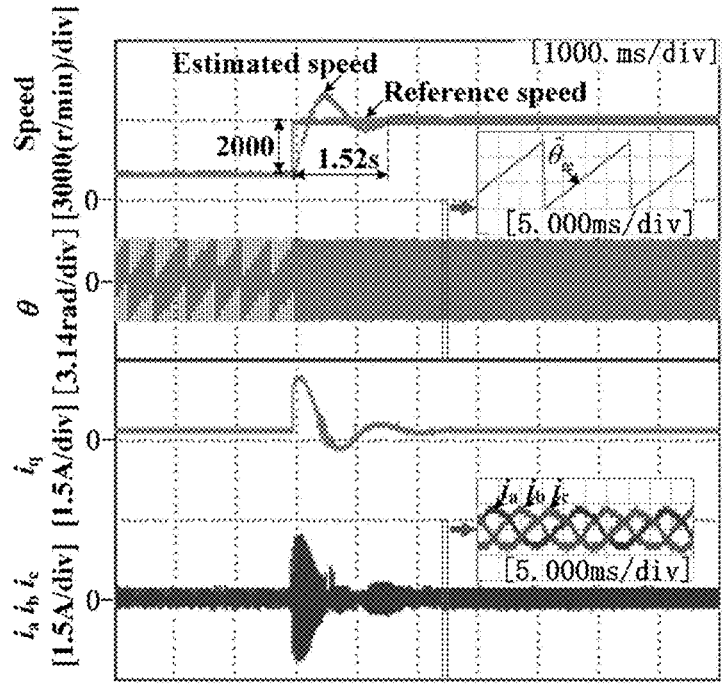
FIG. 6A is the experimental waveform of the invention method at the low-speed operation range.
FIG. 6B is the experimental waveform of the sensorless control method based on the adaptive sliding mode observer at the low-speed operation range.
Figure 6B:
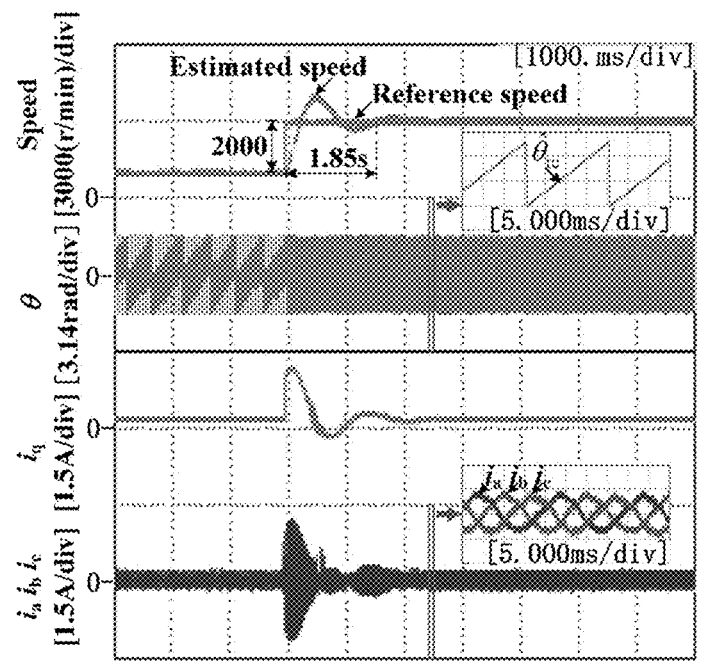

FIG. 6A and FIG. 6B show the experimental waveforms when the permanent magnet synchronous motor uses the invention method or the sensorless control algorithm based on adaptive sliding mode observer proposed by other scholars, respectively. The speed of the permanent magnet synchronous motor steps up from 1000 r/min to 3000 r/min. From top to bottom are the reference speed and estimated speed, estimated position, q-axis current iq, and three-phase currents ia, ib, and ic. [3000 (r/min)/div], [3.14 rad/div], [1.5 A/div] and [1000 ms/div] and [5.000 ms/div] respectively indicate that each cell of the longitudinal speed axis represents 3000 r/min, each cell of the rotor position axis represents 3.14 rad, each cell of the current axis represents 1.5 A, and each cell of the transverse time axis represents 1000 ms, each small cell of the transverse timeline in the enlarged waveform represents 5 ms. It can be seen from FIG. 6 that with the invention method, it only takes 1.52 s to reach the steady state when the permanent magnet motor's speed increases 2000 r/min. However, under the traditional adaptive sliding mode observer algorithm, it takes 1.85 s, that is, the proposed method performed by a specific processor has a faster dynamic response speed at low speed.

The embodiment of the invention does not limit the model of other devices except for the special description of the device, as long as the device can complete the above functions. The person skilled in the art can understand that the attached drawing is only a schematic diagram of a preferred embodiment, and the serial number of the embodiment in the invention is only for description and does not represent the superiority or inferiority of the embodiment. The invention is not limited to the embodiments described above. The above description of specific embodiments is intended to describe and illustrate the technical scheme of the invention, and the above specific embodiments are only indicative and not restrictive. Without deviating from the scope protected by the purposes and claims of the invention, ordinary technicians in the field can also make specific transformations in many forms under the inspiration of the invention, which are within the scope of protection of the invention.

What is claimed is:

1. A direct locating method for calculating a position of a permanent magnet synchronous motor (PMSM), comprising the following steps performed by a processor:

step 1: converting three-phase stator currents of the PMSM sampled at each period to obtain the stator currents in αβ two-phase stationary coordinate system, and determining an initial position region of the PMSM according to the stator currents in the αβ two-phase stationary coordinate system;

step 2: converting the stator currents of the PMSM in the αβ two-phase stationary coordinate system to obtain the stator current of the PMSM in the dq two-phase synchronous rotation coordinate system;

step 3: establishing the stator current cost model of the permanent magnet synchronous motor, and inputting the d-axis stator current of the permanent magnet synchronous motor in the dq two-phase synchronous rotation coordinate system into the stator current cost model and then the position of the permanent magnet synchronous motor is outputted; at the same time, determining a final estimated position from the initial position region of the PMSM according to the stator currents of PMSM in the αβ two-phase stationary coordinate system and dq two-phase synchronous rotation coordinate system, and the direct locating of the PMSM position is realized, wherein in step 3, the stator current cost model of the permanent magnet synchronous motor is established as follows:

$$\min g_{op}(k) = |i_{dref}(k) - i_d(k)|$$
$$i_d(k) = A\sin(\theta + \varphi_k)$$
$$i_q(k) = A\sin(\theta + \varphi_k + \pi/2)$$

where $g_{op}(k)$ is the d-axis stator current error of the permanent magnet synchronous motor at the kth sampling period in the dq two-phase synchronous rotation coordinate system;

$i_{dref}(k)$ is the d-axis stator current reference of the permanent magnet synchronous motor at the kth sampling period in the dq two-phase synchronous rotation coordinate system;

$i_d(k)$ and $i_q(k)$ are the d-axis stator current and q-axis stator current of a permanent magnet synchronous motor in dq two-phase synchronous rotation coordinate system at the kth sampling period, respectively;

θ is the position of the permanent magnet synchronous motor;

A is the stator current amplitude of the permanent magnet synchronous motor;

$\varphi_k$ is the Angle between the stator current of the permanent magnet synchronous motor and the αβ two-phase stationary coordinate system at the kth sampling period, wherein an angle between the stator current of the permanent magnet synchronous motor and the αβ two-phase stationary coordinate system at the kth sampling period, $\varphi_k$, is as follows:

$$\varphi_k = \arctan(i_\alpha(k)/i_\beta(k))$$

where $i_\alpha(k)$ and $i_\beta(k)$ are the α-axis stator current and β-axis stator current of the permanent magnet synchronous motor in the αβ two-phase stationary coordinate system at the kth sampling period, respectively, wherein in step 3, according to the stator currents of the permanent magnet synchronous motor in the αβ two-phase stationary coordinate system and dq two-phase synchronous rotating coordinate system, the final estimated position is determined in the initial position region of the permanent magnet synchronous motor, as follows:

| Region | $i_\alpha$ | $i_\beta$ | $i_q$ | $\theta_{o1}$ |
|---|---|---|---|---|
| R1 | + | + | + | $2\pi-\varphi_k$ |
|  |  |  | − | $\pi-\varphi_k$ |
| R2 | − | + | + | $2\pi-\varphi_k$ |
|  |  |  | − | $3\pi-\varphi_k$ |
| R3 | − | − | + | $2\pi-\varphi_k$ |
|  |  |  | − | $3\pi-\varphi_k$ |
| R4 | + | − | + | $2\pi-\varphi_k$ |
|  |  |  | − | $\pi-\varphi_k$ | where $\theta_{o1}$ is the final estimated position of the permanent magnet synchronous motor in the initial rotor position region.

2. The direct locating method according to claim 1, wherein in step 1, the three-phase stator currents of the PMSM sampled at each period are converted by coordinate to obtain the stator currents of the PMSM in the αβ two-phase stationary coordinate system, wherein a A-phase stator current $i_a$, a B-phase stator current $i_b$, and a C-phase stator current $i_c$ of the PMSM are converted to obtain the α-axis stator current $i_\alpha$ and β-axis stator current $i_\beta$ in the αβ two-phase stationary coordinate system, respectively.

3. The direct locating method according to claim 2, wherein in step 1, the initial position region of the PMSM's position is determined according to the stator currents of the PMSM in the αβ two-phase stationary coordinate system, wherein when $i_\alpha(k)>0$ and $i_\beta(k)>0$, the initial position region is R1, [0, 0.5π];
when $i_\alpha(k)<0$ and $i_\beta(k)>0$, the initial position region is R2, [0.5π, π];
\when $i_\alpha(k)<0$ and $i_\beta(k)<0$, the initial position region is R3, [π, 1.5π];
when $i_\alpha(k)>0$ and $i_\beta(k)<0$, the initial position region is R4, [1.5π, 2π];
wherein $i_\alpha(k)$ and $i_\beta(k)$ are the α-axis stator current and β-axis stator current of a permanent magnet synchronous motor in the αβ two-phase stationary coordinate system at the kth sampling period, respectively.

4. The direct locating method according to the claim 2, wherein in step 2, the stator currents of the permanent magnet synchronous motor in the αβ two-phase stationary coordinate system are converted to obtain the stator currents of the permanent magnet synchronous motor in the dq two-phase synchronous rotating coordinate system, wherein the α-axis stator current $i_\alpha$ and β-axis stator current $i_\beta$ in the αβ two-phase stationary coordinate system of the permanent magnet synchronous motor are converted by coordinate transformation to obtain the d-axis stator current $i_d$ and q-axis stator current $i_q$ in the dq two-phase synchronous rotation coordinate system.

* * * * *